(12) United States Patent
Breedvelt-Schouten et al.

(10) Patent No.: US 9,454,181 B2
(45) Date of Patent: Sep. 27, 2016

(54) WEARABLE FLEXIBLE INTERFACE WITH INTERLOCKING MODULES

(71) Applicant: International Business Machines Corporation, Armonk, NY (US)

(72) Inventors: Ilse M. Breedvelt-Schouten, Ottawa (CA); Jana H. Jenkins, Raleigh, NC (US); Jeffrey A. Kusnitz, Campbell, CA (US); James L. Lentz, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/658,405

(22) Filed: Mar. 16, 2015

(65) Prior Publication Data

US 2016/0026214 A1    Jan. 28, 2016

Related U.S. Application Data

(63) Continuation of application No. 14/338,338, filed on Jul. 22, 2014.

(51) Int. Cl.
| | |
|---|---|
| *G09G 5/00* | (2006.01) |
| *G06F 1/16* | (2006.01) |
| *G06F 3/01* | (2006.01) |
| *G09G 3/32* | (2016.01) |

(52) U.S. Cl.
CPC ............. *G06F 1/163* (2013.01); *G06F 1/1652* (2013.01); *G06F 1/1677* (2013.01); *G06F 3/013* (2013.01); *G06F 3/017* (2013.01); *G09G 3/3208* (2013.01); *G09G 2300/04* (2013.01); *G09G 2380/02* (2013.01)

(58) Field of Classification Search
CPC ........ G06F 3/016; G06F 3/011; G06F 3/038; G06F 3/03543
See application file for complete search history.

(56) References Cited

U.S. PATENT DOCUMENTS

| | | | |
|---|---|---|---|
| 7,289,102 B2 * | 10/2007 | Hinckley | G06F 1/1626 345/156 |
| 7,618,260 B2 | 11/2009 | Daniel et al. | |
| 7,639,237 B2 | 12/2009 | Perkins | |
| 2011/0037742 A1 | 2/2011 | Suh | |
| 2011/0227822 A1 | 9/2011 | Shai | |
| 2013/0222270 A1 * | 8/2013 | Winkler | H04M 1/0233 345/173 |
| 2013/0271352 A1 * | 10/2013 | Wu | G09G 5/00 345/1.1 |

* cited by examiner

*Primary Examiner* — Charles Hicks
(74) *Attorney, Agent, or Firm* — Steven M. Greenberg, Esq.; CRGO Law

(57) ABSTRACT

A wearable flexible interface with interlocking modules includes a substrate integrated into a wristband, and also each of a processor, memory and power source disposed on the substrate, as well as a data bus. A multiplicity of different modules each are coupled to the data bus, each including firmware and a flexible display. Finally, a display controller is disposed on the substrate and coupled to each of the processor, memory, power source and each of the modules by way of the data bus. The display controller includes program code enabled to selectively direct a display of a display characteristic of a particular one of the modules either in a corresponding flexible display of the particular one of the modules, or in single composite display formed by aggregating the flexible displays of all of the modules.

8 Claims, 1 Drawing Sheet

WEARABLE FLEXIBLE INTERFACE WITH INTERLOCKING MODULES

BACKGROUND OF THE INVENTION

1. Field of the Invention

The present invention relates to flexible displays and more particularly to wearable articles utilizing a flexible display.

2. Description of the Related Art

A flexible display is a display that is flexible in nature unlike a more traditional rigid display. A flexible display is a visual display for a computer formed upon a flexible substrate and often relies upon organic light emitting diode (OLED) technology. OLED technology is a flat light emitting technology, constructed through the placement of a series of organic thin films between conductors. Upon applying an electrical current, a bright light is emitted. Thus, OLED can be an effective technology for computer displays. More importantly, because OLED technology does not require a backlight, displays built upon OLED technology are thinner and more efficient than LCD display and can support a flexible substrate.

Curved (concave) display screens are one such display disposed upon a flexible substrate and represent an important new display technology innovation because curved display screens substantially improve display performance by significantly reducing and sometimes eliminating reflections from ambient light sources that washout the on-screen images. By eliminating reflections from ambient light sources, screen readability improves as does image quality. Also, the elimination of washout allows concave displays to run at lower brightness, which increases the power efficiency and battery running time for mobile devices. Of note, the notion of a wearable flexible display has been proposed in connection with curved display screens so that watch type devices may permit viewing of displayed information from different angles.

BRIEF SUMMARY OF THE INVENTION

Embodiments of the present invention address deficiencies of the art in respect to wearable, flexible displays and provide a novel and non-obvious method, system and computer program product for a wearable flexible interface with interlocking modules. In an embodiment of the invention, a wearable flexible interface with interlocking modules includes a substrate integrated into a wristband, and also each of a processor, memory and power source disposed on the substrate, as well as a data bus. A multiplicity of different modules each are coupled to the data bus, each including firmware and a flexible display. Finally, a display controller is disposed on the substrate and coupled to each of the processor, memory, power source and each of the modules by way of the data bus. The display controller includes program code enabled to selectively direct the displaying of a display characteristic of a particular module either in a corresponding flexible display of the particular one of the modules, or in single composite display formed by aggregating the flexible displays of all of the modules.

In one aspect of the embodiment, the display controller selects a display of the display characteristic in the single composite display in response to determining that the substrate is in a flattened state. In another aspect of the embodiment, a sensor is included in each of the modules, such that the display controller selects a display of the display characteristic in the single composite display responsive to a transduced value by the sensor exceeding a threshold value. In yet another aspect of the embodiment, gaze tracking logic is coupled to the processor and identifies a focal point on the modules of a human gaze, such that the display controller selects a display of the display characteristic in the single composite display responsive to the gaze tracking logic identifying a focal point on the particular one of the modules. Finally, in even yet another aspect of the embodiment, an accelerometer is coupled to the processor so as to detect a particular movement of the interface, such that the display controller selects a display of the display characteristic in the single composite display responsive to the accelerometer detecting the particular movement of the interface.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for a wearable flexible interface with interlocking modules. In accordance with an embodiment of the invention, different separable segments of a flexible display can be coupled to a data bus disposed on a wristband containing an underlying data processing system. Selected ones of the segments can include different biometric sensors including temperature, pulse and pH sensors. Each display portion of each segment once positioned on the wristband can be combined into a composite display controlled by the underlying data processing system of the wristband. In this way, in response to a sensed data value by one of the sensors of a corresponding one of the segments having exceeded a threshold value, the entirety of the composite display can be controlled to provide an associated display characteristic. Further, responsive to a physical orientation of the wristband, the entirety of the composite display can be controlled to provide an associated display characteristic.

Figure 1:
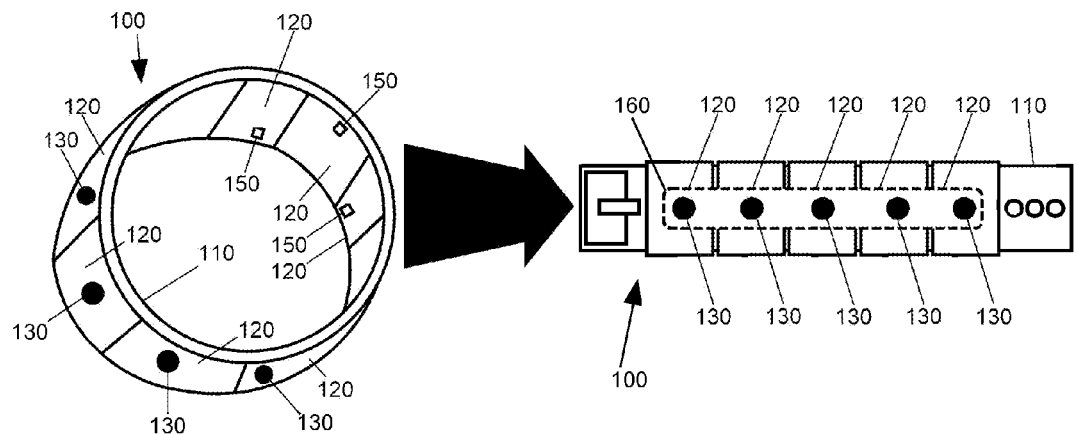
FIG. 1 is a pictorial illustration of a flexible interface with interlocking modules.

In further illustration, FIG. 1 pictorially shows a wearable flexible interface with interlocking modules. As shown in FIG. 1, a wearable flexible interface 100 can be provided as a computing substrate 110 for different modules 120 communicatively coupled to one another on a data bus provided by the substrate 110. Each of the modules 120 can include a flexible display displaying individual display characteristics 130 such as information particular to a corresponding one of the modules 120. For example, the display characteristic 130 can include a textual indicator, word or phrase. Alternatively, the display characteristic 130 can be an image, icon or merely a color or sequence of colors. As yet another alternative, the display characteristic 130 can be a combination of colors, textual data and imagery.

Each of the modules 120 also can include a corresponding sensor 150 embedded therein. Each sensor 150 in turn can be enabled to transduce a real world physical signal such as temperature, pH or pulse rate. In response to the transduction of a real world physical signal by one of the sensors 150 of a corresponding one of the modules 120, a display characteristic 130 of the corresponding one of the modules 120 can be displayed in a flexible display of the corresponding one of the modules 120 in association with the signal transduced by the one of the sensors 150. Notably, the display characteristics 130 in each flexible display of the corresponding modules 120 can be cooperatively controlled by the substrate 110 to provide for an aggregate display 160. In particular, when a value of a signal transduced by one of the sensors 150 exceeds a threshold value, a display characteristic 130 for the transduced signal can be displayed in the aggregate display 160 rather than in only a single flexible display of a corresponding one of the modules 120. As an alternative, when the flexible interface 100 takes on a particular orientation such as being laid out flat, the aggregate display 160 can be provided in lieu of providing an individual display for each corresponding one of the modules 120.

Figure 2:
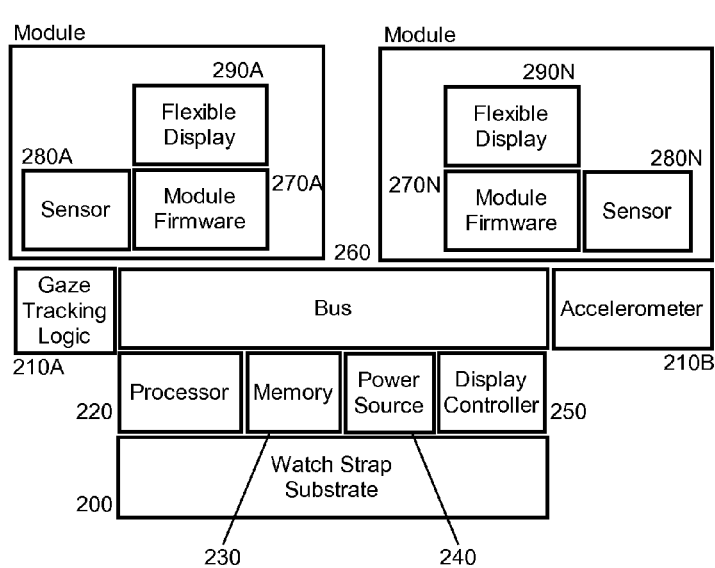
FIG. 2 is a schematic illustration of a watch data processing system including a wearable flexible interface with interlocking modules; and, FIG. 3 is a flow chart illustrating a process for managing a display of data in a wearable flexible interface with interlocking modules.

The process described in connection with FIG. 1 can be implemented as a watch data processing system. In further illustration, FIG. 2 schematically shows a watch data processing system including a wearable flexible interface with interlocking modules. The system can include a watch strap substrate 200. The substrate 200 can include a flexible material such as nylon or stainless steel linkages coupled to one another to form a wristband. A computing system can be disposed upon the substrate 200 and can include a processor 220 coupled to memory 230 and powered by a power source 240, for example a battery. A display controller 250 also can be provided and configured to manage one or more flexible displays coupled thereto.

A data bus 260 can be disposed upon the substrate 200 and communicatively linked to the processor 220 and memory 230. The data bus 260 can receive multiple different modules, each including module firmware 270A . . . 270N and a flexible display 290A . . . 290N. The flexible display 290A . . . 290N can be enabled for control by the display controller 250 to display different display characteristics such as text or imagery or both. The module firmware 270A . . . 270N can include program code consisting of different program instructions able to be loaded into the memory 230 and executed by the processor 220 so as to control a selection of display characteristics to be displayed in the flexible display 290A . . . 290N.

Of note, a sensor 290A . . . 290N can be included as part of a module. The sensor 290A . . . 290N can be configured to transduce one or more natural phenomena such as the pulse of a human being, the temperature or acidity of the human body or outside air, or other such natural conditions. The sensor 290A . . . 290N can be coupled to the processor 220 by way of the data bus 260 and processed according to instructions of the firmware 270A . . . 270N so as to trigger a display of different display characteristics in the flexible display 290A . . . 290N. In this regard, the instructions of the firmware 270A . . . 270N can be enabled to display a particular display characteristic responsive to a transduced value from the sensor 280A . . . 280N exceeding a threshold value.

Optionally, the processor 220 can determine whether or not the substrate 200 is configured in an elliptical state or in a flattened state. In response to a determination that the substrate 200 is configured in an elliptical state, display characteristics for each individual module can be determined based upon the firmware of each respective module and separately displayed in a corresponding one of the flexible displays 290A . . . 290N. In contrast, in response to a determination that the substrate 200 is configured in a flattened state, the display controller 250 can aggregate the flexible displays 290A . . . 290N into a single composite display and only the display characteristics for single one of the modules can be displayed in the single composite display.

Gaze tracking logic 210A also can be coupled to the data bus 260 and incorporated into the substrate 200. The gaze tracking logic 210A can be configured to identify a focal point of a human gaze upon one of the modules. As such, responsive to determining a particular module associated with a focal point of a gaze of the wearer of the wristband, the gaze tracking logic 210A can indicate to the display controller 250 to aggregate the flexible displays 290A . . . 290N into a single composite display and to display a display characteristic of the module corresponding to the focal point of the gaze upon the single composite display.

Yet further, an accelerometer 210B can be coupled to the data bus 260 and incorporated into the substrate 200. The accelerometer 210B can be configured to detect different movements of the wristband. In response to a specific movement of the wristband, a particular one of the modules can be selected and the accelerometer 210B can indicate to the display controller 250 to aggregate the flexible displays 290A . . . 290N into a single composite display and to display a display characteristic of the particular one of the modules upon the single composite display.

Figure 3:
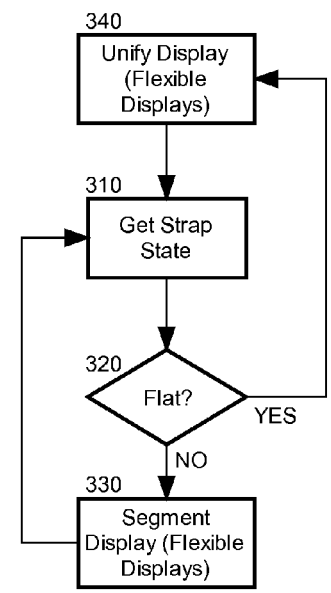

A process of toggling between different display modes of the wearable flexible interface is shown in FIG. 4?. In this regard, FIG. 3 is a flow chart illustrating a process for managing a display of data in a wearable flexible interface with interlocking modules. Beginning in block 310, a configuration state of the wristband of the flexible interface is determined. If in decision block 320 the configuration is determined to be elliptical, in block 330, the display characteristics for each individual module can be determined based upon the firmware of each respective module and separately displayed in a corresponding one of the flexible displays. In contrast, if it is determined in decision block 320 that the configuration state of the wristband is a flattened state, in block 340 the display controller can aggregate the flexible displays into a single composite display and only the display characteristics for single one of the modules can be displayed in the single composite display.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A wearable flexible interface with interlocking modules, the wearable flexible interface comprising:
   a substrate integrated into a wristband;
   a processor, memory and power source disposed on the substrate;
   a data bus coupled to processor, memory and power source;
   a multiplicity of different modules each coupled to the data bus, each module comprising firmware and a flexible display; and,
   a display controller disposed on the substrate and coupled to each of the processor, memory, power source and each of the modules by way of the data bus, the display controller comprising program code enabled to selectively direct a display of a display characteristic of a particular one of the modules either in a corresponding flexible display of the particular one of the modules, or in single composite display formed by aggregating the flexible displays of all of the modules, wherein the display controller determines if either an elliptical state or a flattened state of the substrate of the wristband exists and if it is determined that a flattened state and not an elliptical state of the substrate of the wristband exists, selects a display of the display characteristic in the single composite display responsive to determining a flattened state of the substrate of the wristband.

2. The interface of claim 1, further comprising a sensor in each of the modules, the display controller alternatively selecting a display of the display characteristic in the single composite display responsive to a transduced value by the sensor exceeding a threshold value.

3. The interface of claim 1, further comprising gaze tracking logic coupled to the processor, the gaze tracking logic identifying a focal point on the modules of a human gaze, the display controller alternatively selecting a display of the display characteristic in the single composite display responsive to the gaze tracking logic identifying a focal point on the particular one of the modules.

4. The interface of claim 1, further comprising an accelerometer coupled to the processor, the accelerometer detecting a particular movement of the interface, the display controller alternatively selecting a display of the display characteristic in the single composite display responsive to the accelerometer detecting the particular movement of the interface.

5. A method of managing a display of a display characteristic of a module on a set of flexible displays of a wearable flexible interface comprising a substrate integrated into a wristband, with interlocking modules, the method comprising:
   determining a state of the wearable flexible interface and if a flattened state of a substrate of the wearable flexible interface exists and not an elliptical state; and,
   responsive to a determination that a flattened state of the substrate exists, selectively directing a processor of the wearable flexible interface to display a display characteristic of a particular one of the interlocking modules either in a corresponding flexible display of the particular one of the interlocking modules, or in single composite display formed by aggregating the flexible displays of all of the modules, wherein a display of the display characteristic in the single composite display is selected responsive to determining a flattened state of the substrate of the wristband.

6. The method of claim 5, wherein a display of the display characteristic in the single composite display is alternatively selected responsive to determining that a transduced value by a sensor of the particular one of the interlocking modules exceeds a threshold value.

7. The method of claim 5, further comprising gaze tracking a focal point of a human gaze upon the particular one of the modules and alternatively selecting the single composite display of the display characteristic in response to the gaze tracking.

8. The method of claim 5, further comprising detecting a particular movement of the interface and alternatively selecting a display of the display characteristic in the single composite display responsive to the detecting the particular movement.

* * * * *